United States Patent
Ross et al.

(10) Patent No.: US 7,281,116 B2
(45) Date of Patent: Oct. 9, 2007

(54) MULTIPROCESSOR SYSTEM HAVING PLURAL MEMORY LOCATIONS FOR RESPECTIVELY STORING TLB-SHOOTDOWN DATA FOR PLURAL PROCESSOR NODES

(75) Inventors: Jonathan K. Ross, Woodlinville, WA (US); Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 10/903,200

(22) Filed: Jul. 30, 2004

(65) Prior Publication Data

US 2006/0026359 A1    Feb. 2, 2006

(51) Int. Cl.
*G06F 12/00* (2006.01)
(52) U.S. Cl. ...................................................... 711/207
(58) Field of Classification Search ................ 711/207, 711/206, 203
See application file for complete search history.

(56) References Cited

U.S. PATENT DOCUMENTS

| | | | | |
|---|---|---|---|---|
| 4,733,348 A | * | 3/1988 | Hiraoka et al. ............. | 711/207 |
| 5,428,757 A | * | 6/1995 | Sutton ......................... | 718/107 |
| 5,437,017 A | * | 7/1995 | Moore et al. ................ | 709/213 |
| 5,574,878 A | * | 11/1996 | Onodera et al. ............. | 711/207 |
| 5,906,001 A | | 5/1999 | Wu | |
| 5,928,353 A | * | 7/1999 | Yamada ...................... | 712/200 |
| 6,119,204 A | * | 9/2000 | Chang et al. ................ | 711/141 |
| 6,345,352 B1 | * | 2/2002 | James et al. ................ | 711/210 |
| 6,604,185 B1 | * | 8/2003 | Fromm ........................ | 711/207 |
| 6,633,967 B1 | * | 10/2003 | Duncan ...................... | 711/207 |
| 6,684,315 B2 | * | 1/2004 | James et al. ................ | 711/210 |
| 6,728,800 B1 | | 4/2004 | Lee | |
| 2002/0172199 A1 | * | 11/2002 | Scott et al. ................. | 370/389 |
| 2004/0044872 A1 | | 3/2004 | Scott | |
| 2004/0215897 A1 | * | 10/2004 | Arimilli et al. ............. | 711/144 |
| 2004/0215898 A1 | * | 10/2004 | Arimilli et al. ............. | 711/144 |

* cited by examiner

*Primary Examiner*—Matthew Kim
*Assistant Examiner*—Ryan Dare

(57) ABSTRACT

The present invention provides a multiprocessor system and method in which plural memory locations are used for storing TLB-shootdown data respectively for plural processors. In contrast to systems in which a single area of memory serves for all processors' TLB-shootdown data, different processors can describe the memory they want to free concurrently. Thus, concurrent TLB-shootdown request are less likely to result in performance-limiting TLB-shootdown contentions that have previously constrained the scaleability of multiprocessor systems.

11 Claims, 4 Drawing Sheets

MULTIPROCESSOR SYSTEM HAVING PLURAL MEMORY LOCATIONS FOR RESPECTIVELY STORING TLB-SHOOTDOWN DATA FOR PLURAL PROCESSOR NODES

BACKGROUND OF THE INVENTION

The present invention relates to computers and, more particularly, to multiprocessor systems employing TLB shootdown as part of a memory-management scheme. A major objective of the invention is to provide an approach to TLB shootdown that scales well with large numbers of processors in a multi-processor system.

Many modern computer systems use virtual-memory schemes to match the memory requirements of the computer programs run on these systems to available memory resources. An operating system typically assigns virtual memory address "pages" to each program, and assigns these virtual-memory pages to physical memory pages, preferably in solid-state random access memory (RAM), with excess virtual memory pages being assigned to hard-disk locations on some priority basis when RAM capacity is exceeded. The virtual-memory assignments are stored in a page table, typically in RAM. So that a processor does not have to perform a time-consuming access of main memory every time a virtual memory assignment needs to be read, copies of recently used page-table assignments can be cached in a translation look-aside buffer (TLB).

Typically, when a program terminates, some of the virtual memory assigned to it can be made available to other programs. The operating system can instruct the processor running the program to de-assign the no-longer-needed virtual memory pages in the page table. Then any corresponding TLB entries for that processor and for any other processor in a multiprocessor system must be purged so that all TLBs are coherent with the page table. To this end, a processor can write its TLB shootdown to a dedicated location in main memory and send an interrupt to the other processors, which then read the TLB-shootdown data, purge their TLBs accordingly, and report when their purges are complete. The de-assigned virtual memory can then be released for reassignment.

Various lockout mechanisms can be employed to prevent a processor from writing TLB-shootdown data to the TLB-shootdown memory location when it is in use by another processor. The processor that is locked out waits until the first TLB purge is complete before it can begin its own TLB purge. The "waiting" actually can involve a lot of rechecking, which can consume system bandwidth. As the number of processors increases, the frequency of contentions, the waiting periods, and the bandwidth consumption all increase, limiting scalability. What is needed is an approach to TLB-shootdown that scales better with the number of processors in a multiprocessor system.

SUMMARY OF THE INVENTION

The present invention provides a multiprocessor system and method in which plural memory locations are used for storing TLB-shootdown data respectively for plural processors. A major advantage of the invention is that processors do not have to "take turns" writing their TLB-shootdown list. In contrast to systems in which a single area of memory serves for all processors' TLB-shootdown data, different processors can describe the memory they want to free concurrently. This becomes important in multiprocessor systems with large numbers of processors, since the likelihood of concurrent TLB shootdowns increases rapidly with the number of processors. These and other features and advantages of the invention are apparent from the description below with reference to the following drawings.

BRIEF DESCRIPTION OF THE DRAWINGS

Specific embodiments of the invention are illustrated in the following figures, which are not depictions of the invention itself.

DETAILED DESCRIPTION

Figure 1:
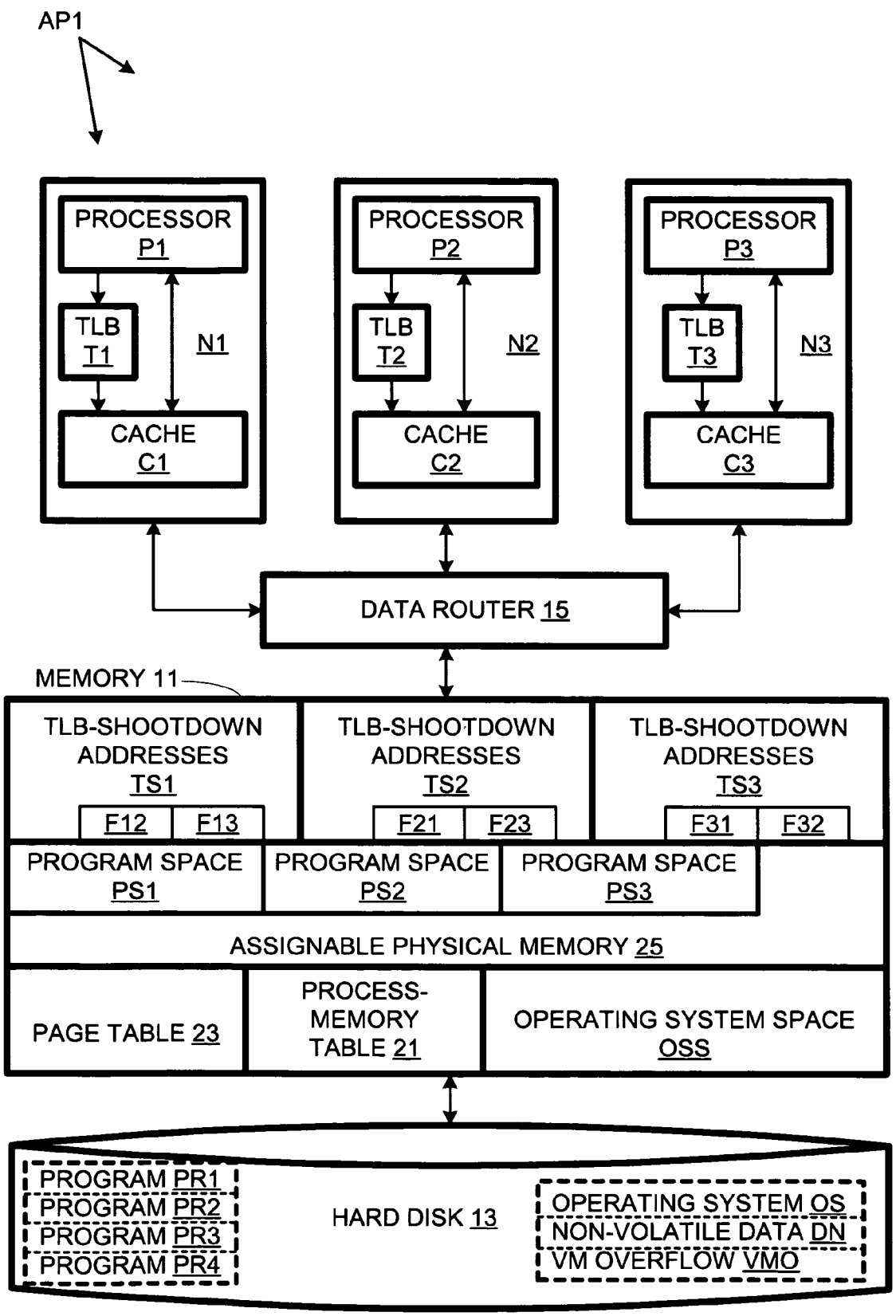
FIG. 1 depicts a multiprocessor computer system in accordance with the present invention.

A multiprocessor computer system AP1 comprises three processor nodes N1, N2, and N3, volatile physical memory 11, a hard disk 13, and a signal router 15. System AP1 includes three nodes, which suffices to explain the invention. However, the marginal advantage of the invention is greater for embodiments with more nodes, e.g., 48 or more. Node N1 includes a processor P1, a TLB T1, and a cache C1. Likewise, node N2 includes a processor P2, a TLB T2, and a cache C2. Also, node N3 includes a processor P3, a TLB T3, and a cache C3. Data communication among processors P1-P3 and between the processors and memory 11 is via signal router 15; in addition, interrupts are transmitted via signal router 15.

Hard disk 13 provides non-volatile long-term storage for system AP1. It can store an operating system OS, programs including programs PR1-PR4, non-volatile data DN, and overflow virtual-memory pages VMO (when physical memory is too small to fit all requested virtual memory). Upon boot-up of system AP1, part of operating system OS becomes resident in operating system space OSS of physical memory 11. Operating system OS also reserves memory space for a process-memory table 21, a page table 23, and TLB-shootdown lists TS1, TS2, and TS3. Lists TS1, TS2, and TS3 provide for storing shootdown data for a respective node N1, N2, and N3; these lists provide flags F12, F13, F21, F23, F31, and F32 that indicate whether a requested shootdown has been completed for each combination of requesting node and responding node. The bulk of memory 11 is assignable physical memory 25 for use by programs PR1-PR4.

In this example, program PR1 is launched on node N1. Operating system OS requests a virtual memory block to be reserved for program PR1, storing this virtual-memory-to-program assignment in process-memory table 21. Operating system OS inspects physical page table 23 to find a free region of assignable physical memory space 25 and, accordingly, assigns the requested virtual memory pages to a free physical memory space PS1; processor P1 then marks space PS1 unavailable and owned by processor P1.

Then program PR2 is launched on node N2. Operating system OS checks virtual page table 21 for free virtual memory pages and assigns some to program PR2. An instance of operating system OS running on processor P2 inspects physical page table 23 for free physical memory pages; since space PS1 is marked unavailable, processor P2 selects free space PS2, which is then marked owned by processor P2. Program PR3 is launched on node N3; the virtual memory space it requires cannot be assigned to spaces PS1 or PS2, and so it is assigned to space PS3, which is then marked unavailable and owned by processor P3. The remainder of assignable memory space 25 remains available for future assignment. The assigned spaces can be used for memory-resident program code and temporary data.

Figure 2:
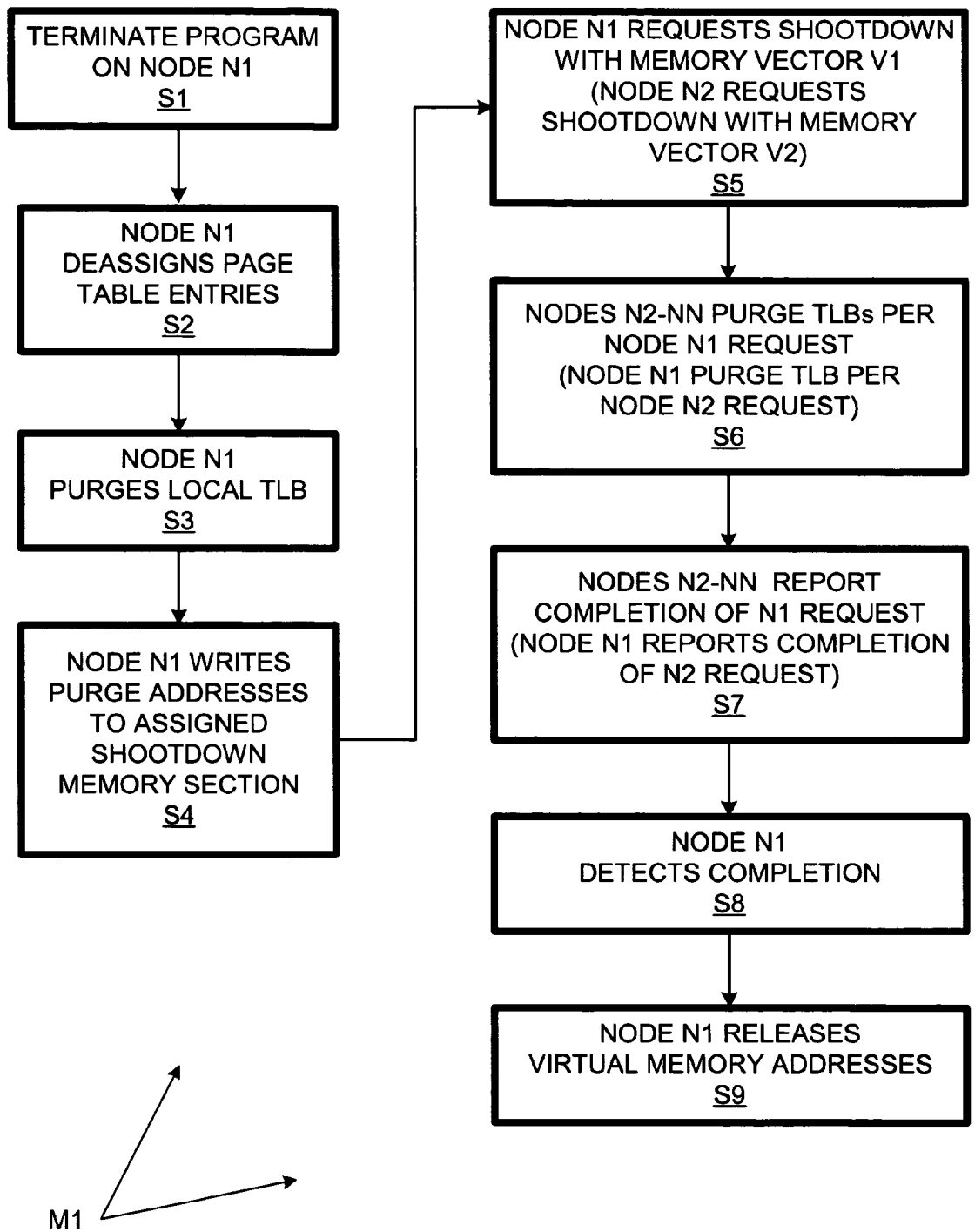
FIG. 2 is a flow chart of a method of the invention practiced in the context of the system of FIG. 1.

At this point, a method M1 in accordance with the invention applies to the example; method M1 is flow-charted in FIG. 2. At step S1, program PR1 terminates. Operating system OS determines from process-memory table 21 that some virtual memory pages can be made available now that program PR1 no longer requires them. (There may be some virtual-memory pages used by program PR1 that cannot be freed because they are shared with another program.) Operating system OS instructs node N1 to free virtual memory for reassignment. Accordingly, node N1 de-assigns that virtual memory space in physical page table 23, but retains ownership over the corresponding entries. Then operating system OS instructs node N1 to purge TLB T1 of any entries relating to the de-assigned virtual memory space at step S3. Then node N1 writes addresses to be purged to shootdown memory space TS1 at step S4.

At step S5, node N1 broadcasts a request for a TLB shootdown by activating an interrupt and asserting a vector corresponding to memory space TS1. Nodes N2 and N3 respond to the request by reading the shootdown specification from space TS1 and implementing the indicated purge at step S6. Each receiving processor N2, N3 reports successful completion of the purge by setting dedicated flags F12 and F13 (shown in FIG. 1) at step S7. Node N1 can repeatedly examine flags F12 and F13. Once all flags are set, node N1 can detect by reading flags F12 and F13 that the shootdown request has been met at step S8. In response, node N1 releases ownership of the specified virtual addresses so that they are available for reassignment at step S9.

In FIG. 2, steps S5, S6, and S7 have supplementary actions described in parentheses. These are intended to show how the illustrated embodiment handles concurrent TLB-shootdown request. For example, node N2 can request a TLB shootdown concurrent with step S5. This request can be received by node N1 while node N1 is awaiting a response to its TLB-shootdown request. In the absence of the request from node N2, node N1 would check the flag status for memory space TS1 periodically to determine when the other nodes have completed their purges in response to the request by node N1. However, the request by node N2 interrupts this checking; rather than continue checking memory, node N1 responds to the request by node N2 by reading space TS2 and purging the addresses indicating therein at step S6. Then node N1 reports completion of the purge by setting a flag at memory space TS2. When this reporting is complete, node N1 returns to checking the completion status of space TS1. Completion of the node N1 request is indicated at step S9 when all flags of space TS1 are set. Then node N1 releases virtual memory by writing to physical page table 23.

Figure 3:
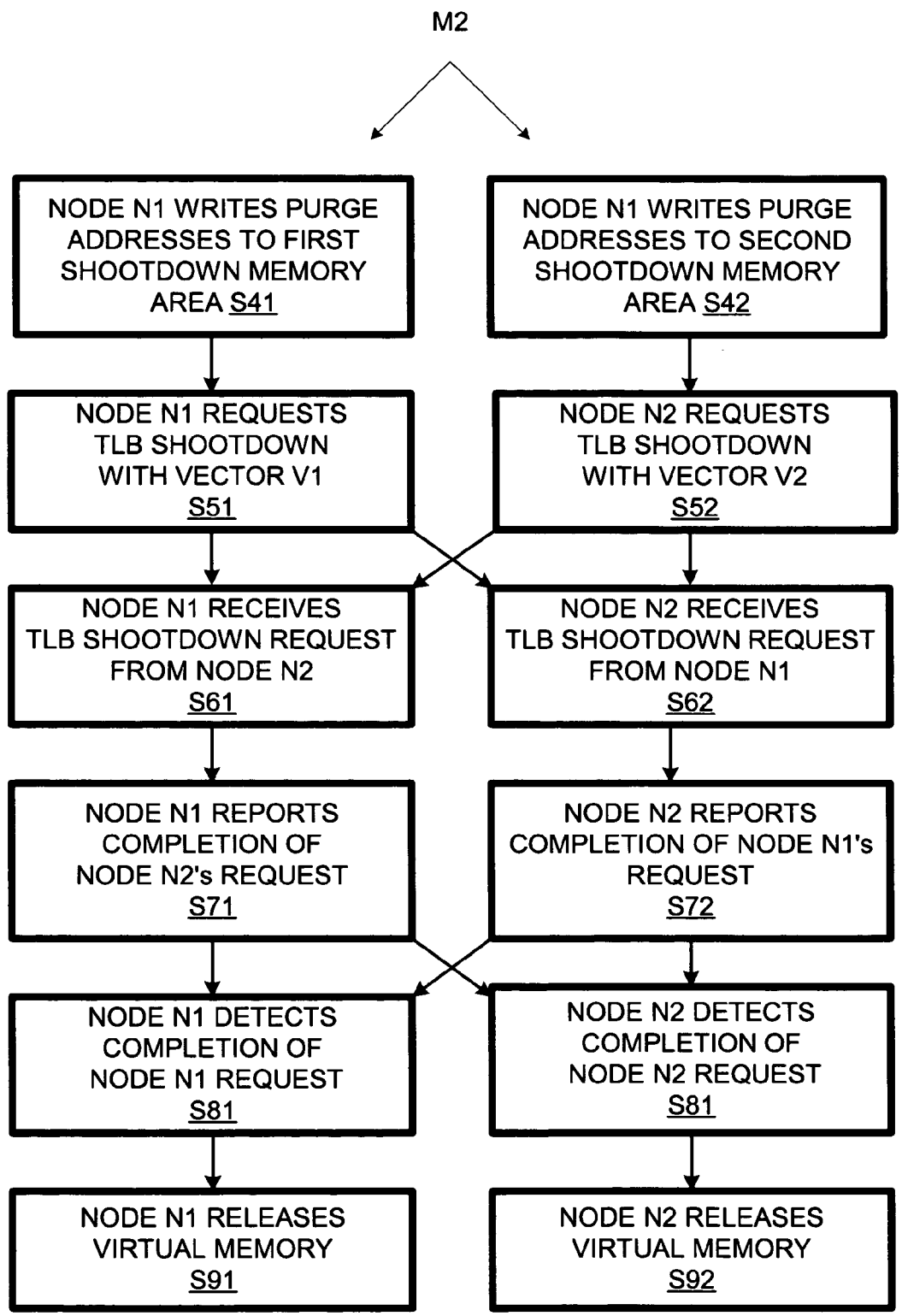
FIG. 3 is a flow chart of a portion of the method of FIG. 2 showing explicit parallelism.

The parallelism provided by system AP1 is perhaps more apparent in FIG. 3, which is a flow chart of a method M2, which is a reconceptualization of steps S4-S9 of method M1. Method M2 begins with steps S41 and S42 with nodes N1 and N2 writing shootdown data into first and second shootdown memory areas. Then, at steps, S51 and S52, nodes N1 and N2 respectively request TLB shootdowns. Each node receives the other's shootdown request at respective steps S61 and S62. Each node reports completion of the other nodes request respectively at steps S71 and S72. Each node detects that its request has been met respectively at step S81 and S82. Each node releases the virtual memory associated with its purge request at respective steps S91 and S92. As is apparent from FIG. 3, the present invention allows a TLB request can be performed concurrently.

In some cases, shootdown requests are issued a page at a time. However, the invention also provides for embodiments that list a large set of pages in the TLB-shootdown space so that fewer requests are required. Even where a series of request are required for freeing virtual memory for reassignment, the invention provides for performance savings over the prior art. In some embodiments, even though requests are performed serially, some pipelining is possible. For example, a node can begin writing a second page in the page table while issuing a TLB-shootdown request for a first page.

Figure 4:
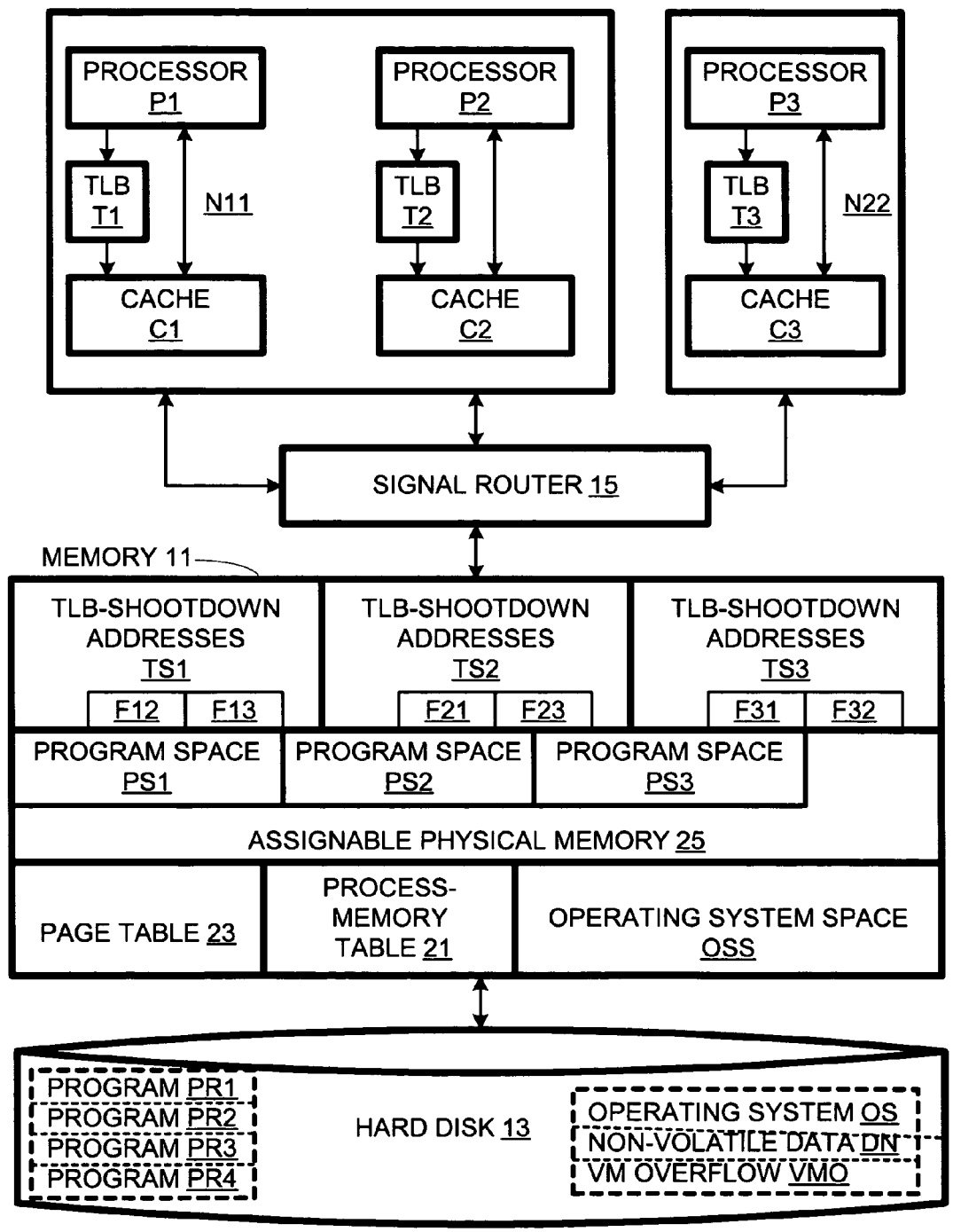
FIG. 4 depicts another multiprocessor computer system in accordance with the present invention.

The assignment of processors and associated components is not fixed, but can be configured by a system administrator for system AP1. For example, system AP1 can be configured with two processors P1 and P2 assigned to a node N11, as shown in FIG. 4. Processor P3 is assigned to node N22. Processors P1 and P2 are associated with the same TLB-shootdown memory TS1. If processor P1 and P2 attempt concurrent TLB-shootdown requests, there will be a race condition. One processor will have its request processed and the other will have to wait, as in some conventional systems employing TLB shootdown. However, as long as the number of processors per node is small, the infrequency of such conflicts renders them manageable. An advantage of combining processors within a node is that fewer vectors and memory spaces are required for the multiprocessor system. For example, assigning two processors per node halves the number of distinct vectors required—which may be helpful in a system with a limited number of vectors (e.g., 256) and with lots of devices to assign to the available vectors.

In the embodiment of FIG. 3, if processor P1 is requesting a TLB-shootdown, processor P2 must wait until that shootdown is completed before asserting its own. In alternative embodiments, processors are dynamically reassigned to nodes to minimize such contentions. For example, if processor P1 is managing a TLB shootdown, processor P2 can be dynamically reassigned to node N22 either immediately or in case processor P2 needs to initiate its own TLB shootdown.

In the illustrated embodiments, there is a fixed assignment of TLB lists to nodes. In some alternative embodiments, TLB-lists are assigned to nodes upon request, e.g., in a round-robin fashion. This can reduce the number of vectors required as there can be fewer lists than nodes. If more nodes request TLB shootdowns than there are lists available, conventional lockout, e.g., semaphore-based, techniques can be applied. As an alternative to indicating which nodes have completed the purge, it is possible to simply count the number of completions; this allows the use of more efficient hardware atomic increment operations to determine when a TLB-shootdown request has been satisfied. These and other variations upon and modification to the illustrated embodiments are provided for by the present inventions, the scope of which is defined by the following claims.

What is claimed is:

1. A multiprocessor computer system comprising:
n processor including first and second processors, n being a counting number greater than 2;
n TLB's associated with respective ones of said processors; and m<n memory locations for storing TLB-shootdown data, where m is counting number greater than or equal to two, each of said locations being addressable by at least one of said processors, at least one of said locations being addressable by at least two of said processors, said locations including first and second locations so that, in the event said second processor issues a second TLB-shootdown request for at least one TLB shootdown at the same time or after said first processor issues a first TLB-shootdown request for at least one TLB shootdown but before said first request is fulfilled, said first location stores TLB-shootdown data specified by said first processor while said second location stores TLB-shootdown data specified by said second processor.

2. A system as recited in claim 1 wherein said first and second processors issue TLB-shootdown requests in the form of respective first and second interrupts accompanied by respective first and second vectors corresponds to said first and second memory locations respectively, said first and second memory locations being in main memory.

3. A system as recited in claim 1 wherein said first n processor further include a third processors, said first location storing all TLB-shootdown data specified by said third processor.

4. A system as recited in claim 1 wherein said memory locations are dynamically assigned to said processor as they make TLB-shootdown requests.

5. A system as recited in claim 4 wherein said memory locations are assigned to said processor on a round-robin basis.

6. A system as recited in claim 1 wherein said each of said memory locations stores indications of which of said processors have completed a respective TLB-shootdown request.

7. A system as recited in claim 1 wherein said first memory location stores indications of how many of said processors have completed said a respective TLB-shootdown request.

8. A method comprising:
   a first of n processors in a multiprocessor system issuing a first TLB-shootdown request;
   storing data for said TLB-shootdown request in a first of m memory locations, where $2 \leq m < n$;
   a second of said processors issuing a second TLB-shootdown request while said first TLB-shootdown request is being executed;
   determining whether or not at least one of said m memory locations is available for storing data associated with said second TLB-shootdown request;
      if a memory location is available, executing said second TLB shootdown request concurrently with the execution of said first TLB shootdown request; and
      if a memory location is not available, deferring said second TLB-shootdown request until at least one other TLB-request has completed execution.

9. A method as recited in claim 8 wherein said all TLB-shootdown requests issued by said first and second processors and then executed have their respective data stored in said first memory location.

10. A method as recited in claim 8 wherein said memory locations are assigned to said processors dynamically as TLB-shootdown requests are made.

11. A method as recited in claim 8 wherein said memory locations are assigned to said processors on a round-robin basis.

* * * * *

UNITED STATES PATENT AND TRADEMARK OFFICE
CERTIFICATE OF CORRECTION

PATENT NO. : 7,281,116 B2  Page 1 of 1
APPLICATION NO. : 10/903200
DATED : October 9, 2007
INVENTOR(S) : Jonathan K. Ross et al.

It is certified that error appears in the above-identified patent and that said Letters Patent is hereby corrected as shown below:

In column 4, line 64, in Claim 1, delete "processor" and insert -- processors --, therefor.

In column 5, line 2, in Claim 1, after "is" insert -- a --.

In column 5, line 19, in Claim 2, delete "corresponds" and insert -- correspond --, therefor.

In column 5, line 22, in Claim 3, after "said" delete "first".

In column 5, line 23, in Claim 3, delete "processor" and insert -- processors --, therefor.

In column 5, line 23, in Claim 3, delete "processors" and insert -- processor --, therefor.

In column 5, line 27, in Claim 4, delete "processor" and insert -- processors --, therefor.

In column 5, line 30, in Claim 5, delete "processor" and insert -- processors --, therefor.

In column 6, line 3, in Claim 7, after "completed" delete "said".

Signed and Sealed this

Ninth Day of March, 2010

David J. Kappos
*Director of the United States Patent and Trademark Office*